(12) United States Patent
Aihara (10) Patent No.: US 8,587,934 B2
(45) Date of Patent: Nov. 19, 2013

(54) WATERPROOF STRUCTURE FOR ELECTRONIC DEVICE

(75) Inventor: Masayuki Aihara, Osaka (JP)

(73) Assignee: Panasonic Corporation, Osaka (JP)

( * ) Notice: Subject to any disclaimer, the term of this patent is extended or adjusted under 35 U.S.C. 154(b) by 212 days.

(21) Appl. No.: 13/174,786

(22) Filed: Jul. 1, 2011

(65) Prior Publication Data

US 2012/0188690 A1 Jul. 26, 2012

(30) Foreign Application Priority Data

Jan. 21, 2011 (JP) .................................. 2011-010396
Jun. 16, 2011 (JP) .................................. 2011-133934

(51) Int. Cl.
*G06F 1/16* (2006.01)

(52) U.S. Cl.
USPC ................... 361/679.01; 455/575.4; 206/320; 381/382

(58) Field of Classification Search
USPC ............... 455/575.1, 575.3, 556.1, 557, 566, 455/575.4, 569.1; 206/701, 320; 348/375; 361/679.01, 679.3, 679.31, 679.32, 361/679.55, 679.06, 679.21, 679.53, 361/679.47, 679.4, 679.08, 679.27, 679.09, 361/679.28; 174/50.5, 50, 650; 381/189, 381/382

See application file for complete search history.

(56) References Cited

U.S. PATENT DOCUMENTS

| | | | |
|---|---|---|---|
| 2005/0179813 A1* | 8/2005 | Fujii et al. ..................... | 348/375 |
| 2005/0277450 A1 | 12/2005 | Hoshijima | |
| 2010/0200456 A1* | 8/2010 | Parkinson ..................... | 206/701 |
| 2012/0063077 A1* | 3/2012 | Tomobe et al. .......... | 361/679.01 |

FOREIGN PATENT DOCUMENTS

| | | |
|---|---|---|
| JP | 8-79865 A | 3/1996 |
| JP | 2005-318209 A | 11/2005 |
| JP | 6-34389 U | 9/2007 |
| JP | 2007-250905 A | 9/2007 |
| JP | 2009-71392 A | 4/2009 |

* cited by examiner

*Primary Examiner* — Hung Duong
(74) *Attorney, Agent, or Firm* — Shinjyu Global IP (57) ABSTRACT

A waterproof structure for an electronic device is provided that includes a speaker, a housing, and a cover. The housing holds the speaker and includes at least one through-hole to transmit sound produced by the speaker. The cover includes a first sheet and a second sheet laminated to the first sheet. The stiffness of the second sheet is greater than the stiffness of the first sheet, and the cover is fixed to the housing to seal the at least one through-hole.

8 Claims, 9 Drawing Sheets

WATERPROOF STRUCTURE FOR ELECTRONIC DEVICE

CROSS-REFERENCE TO RELATED APPLICATIONS

This application claims priority under 35 U.S.C. §119 to Japanese Patent Application No. 2011-010396, filed on Jan. 21, 2011 and Japanese Patent Application No. 2011-133934, filed on Jun. 16, 2011. The entire disclosure of Japanese Patent Applications No. 2011-010396 and Japanese Patent Application No. 2011-133934 are hereby incorporated herein by reference.

BACKGROUND

1. Technical Field

The technology disclosed herein relates to a waterproof structure for an electronic device such as, for example, a digital camera, a video camera, or a portable telephone. More particularly, the technology disclosed herein relates to a waterproof structure for a speaker unit disposed in an electronic device.

2. Background Information

Various structures have been proposed in the past for providing a speaker to an electronic device equipped with a waterproof structure. With the conventional waterproof structure for an electronic device disclosed in Japanese Laid-Open Utility Model Application H6-34389, a secondary diaphragm made from a material that is impervious to water is provided to a speaker front face, thereby achieving a waterproof structure without using any special speaker or any special speaker mounting method.

With the above-mentioned conventional waterproof structure for an electronic device, however, it is sometimes difficult to ensure good sound pressure while at the same time reducing rattle. For example, a flat member is sometimes provided, separated by a thin gap, on the inside of a secondary diaphragm in order to improve the water resistance of an electronic device. When this is done, even if the secondary diaphragm is subjected to relatively high water pressure, since the secondary diaphragm is deformed inward by the water pressure and is supported by the flat member, it is less likely that the secondary diaphragm will be torn by the water pressure.

Nevertheless, water pressure may cause the secondary diaphragm to deform so much that it does not return to its original state even after the water pressure has been released, the result being that it stays in a state that is closer to the flat member on the inside than in its original state. In this case, since the flat member is just to the inside of the secondary diaphragm, when the amplitude of the secondary diaphragm increases as the sound pressure of the speaker rises, the secondary diaphragm comes into contact with the flat member, and this generates noise, which is called rattle.

On the other hand, if a material having enough tensile strength (or stiffness) that it will not deform under water pressure is used for the secondary diaphragm, then the amount of vibration of the secondary diaphragm (such as the amplitude) is curbed, and this greatly lowers the sound pressure. Thus, with a conventional waterproof structure, it is sometimes difficult to ensure good sound pressure while at the same time reducing rattle noise.

SUMMARY

One object of the technology disclosed herein is to provide a waterproof structure for an electronic device in which good sound pressure can be ensured while simultaneously reducing the rattling noise commonly encountered in the prior art.

In accordance with one aspect of the technology disclosed herein, a waterproof structure for an electronic device is provided that includes a speaker, a housing, and a cover. The housing holds the speaker and includes at least one through-hole to transmit sound produced by the speaker. The cover includes a first sheet and a second sheet laminated to the first sheet. The stiffness of the second sheet is greater than the stiffness of the first sheet, and the cover is fixed to the housing to seal the at least one through-hole.

These and other features, aspects and advantages of the technology disclosed herein will become apparent to those skilled in the art from the following detailed description, which, taken in conjunction with the annexed drawings, discloses a preferred and example embodiments of the present invention.

BRIEF DESCRIPTION OF DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

These drawings, however, are merely schematic representations, and the various dimensional proportions and so forth may be different in reality. Therefore, the specific dimensions and so forth should be determined by referring to the following description. Also, it should go without saying that the dimensional relations and proportions may vary from one drawing to another.

In the following embodiments, a digital camera will be used as one example of an electronic device equipped with a waterproof structure. In the following description, the direction facing the subject is defined as "forward," the direction moving away from the subject as "rearward," the vertically upward direction as "upward," the vertically downward direction as "downward," to the right in a state of facing the subject head on as "to the right," and to the left in a state of facing the subject head on as "to the left," all using the normal orientation of the digital camera (hereinafter referred to as landscape orientation) as a reference. Similarly, "front," "rear," "up," "down," "right," and "left" are terms defined using as a reference a digital camera in a landscape orientation with respect to the subject. "Landscape orientation" here is the orientation of a digital camera when the long-side direction of a rectangular image that is wider than it is tall substantially coincides with the horizontal direction in the image.

These terms used for describing front, rear, up, down, right, and left are not to be taken as limiting the disposition of the various constituent elements of the digital camera pertaining to these embodiments.

Overall Configuration of Digital Camera 100

Figure 1:
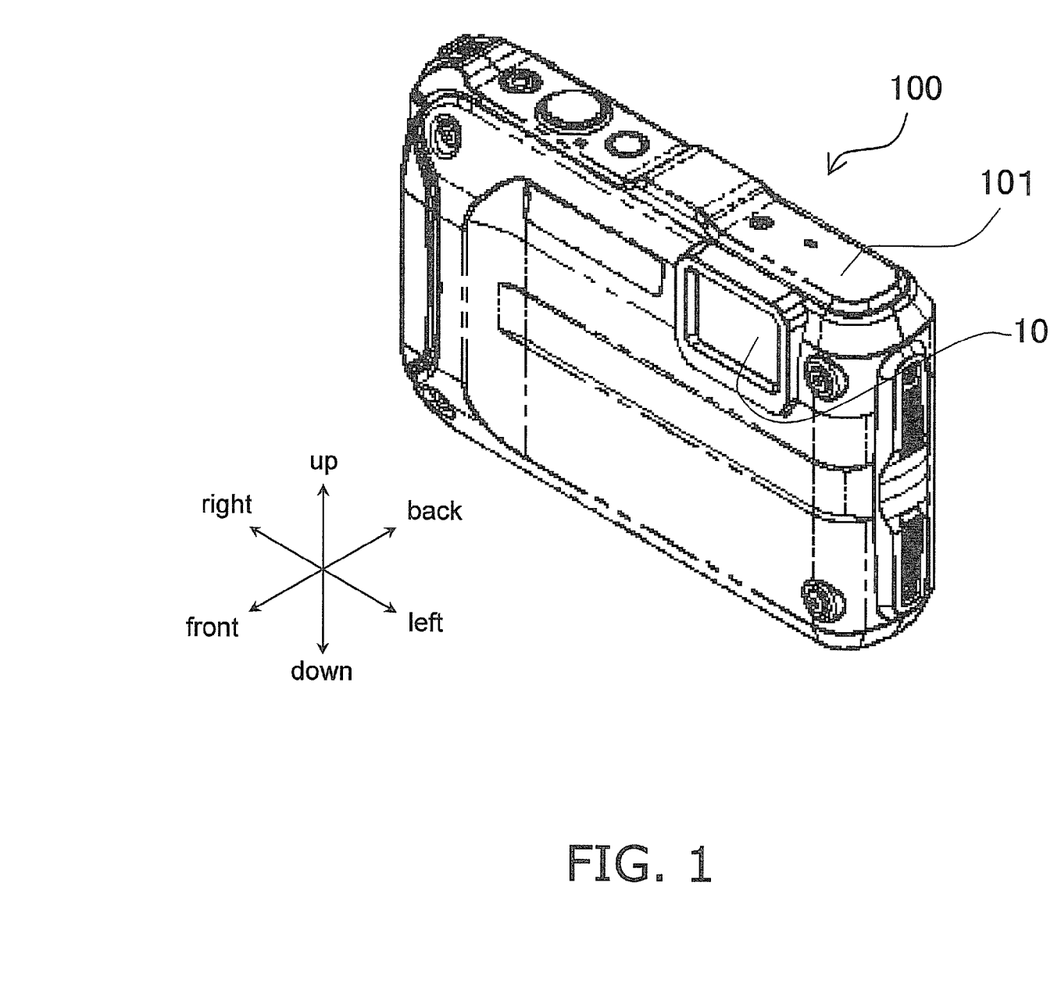
FIG. 1 is an external oblique view of a digital camera 100 pertaining to an embodiment as seen from the front.
Figure 2:
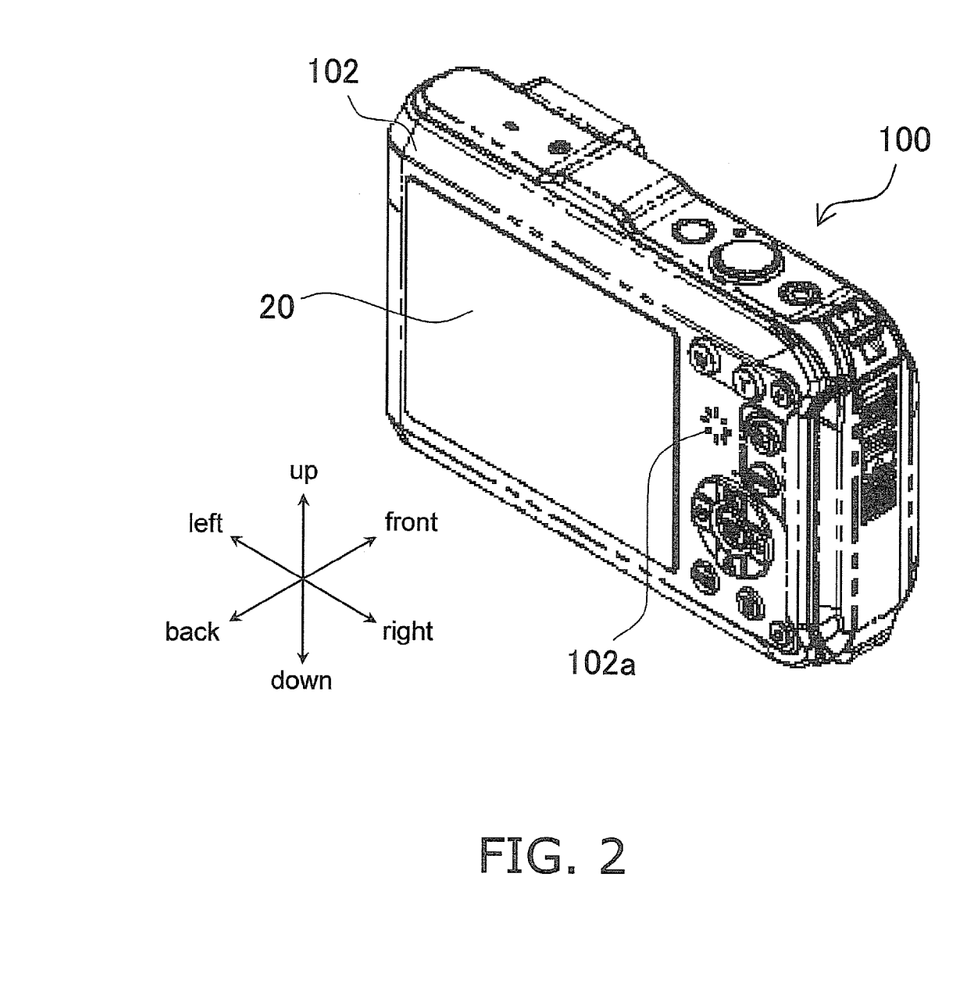
FIG. 2 is an external oblique view of the digital camera 100 pertaining to an embodiment as seen from the rear.

FIG. 1 is an external oblique view of a digital camera 100 pertaining to this embodiment as seen from the front. FIG. 2 is an external oblique view of the digital camera 100 pertaining to this embodiment as seen from the rear.

The digital camera 100 has the functions of capturing, recording, and reproducing still pictures. The digital camera 100 is also an electronic device capable of reproducing audio. More specifically, the digital camera 100 has the functions of capturing, recording, and reproducing moving pictures with sound.

The digital camera 100 comprises a housing 40 and a rear frame 102. The housing 40 has a front unit 101 and a rear case unit 207 (discussed below). The rear frame 102 is one of the members forming the outer shell of the digital camera 100, and is disposed to the rear of the housing 40.

The digital camera 100 also has an optical system 10, a monitor 20, and a microphone (not shown). Light from a subject is incident on the optical system 10. When the digital camera 100 captures a still or moving picture, the light incident from the subject is converted into an image and recorded. The monitor 20 displays the recorded image, for example. The microphone collects sound from around the digital camera 100. When the digital camera 100 records a moving picture, the sound collected by the microphone is recorded. A speaker 209 (discussed below) reproduces the recorded sound.

Figure 3:
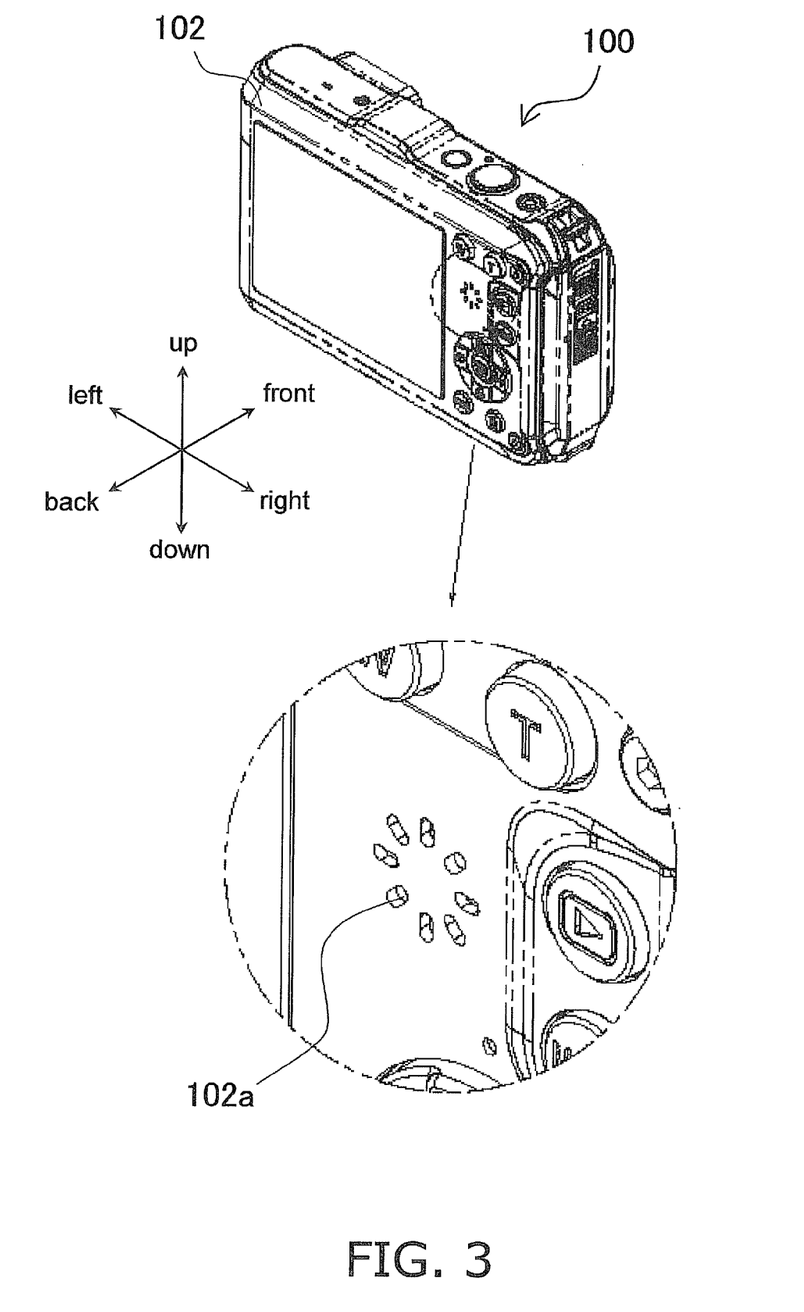
FIG. 3 is a detail view of the area around a speaker unit 30 of the digital camera 100 pertaining to an embodiment.

FIG. 3 is a detail view of the area around a speaker unit 30 of the digital camera 100 pertaining to this embodiment. The speaker unit 30 is provided to the rear face of the digital camera 100. The speaker unit 30 emits sound toward the rear of the digital camera 100. A first speaker hole 102a is provided at the portion of the rear frame 102 corresponding to the speaker unit 30. The first speaker hole 102a includes a plurality of holes that go through the rear frame 102. The speaker unit 30 includes the first speaker hole 102a. The sound emitted from the speaker 209 is transmitted through the first speaker hole 102a to the outside.

Figure 4:
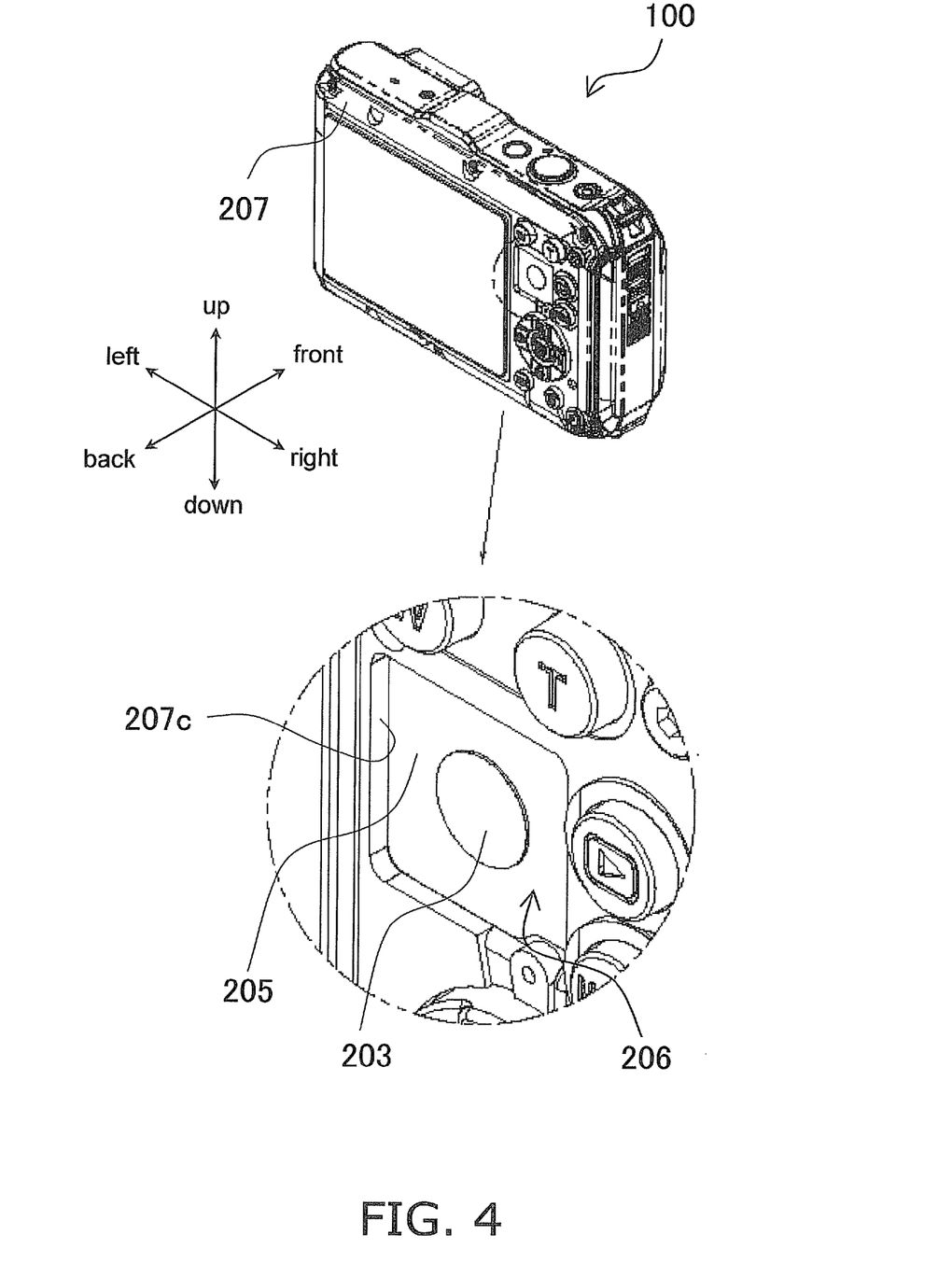
FIG. 4 is a detail view of the area around the speaker unit 30 of the digital camera 100 pertaining to an embodiment (a state in which a rear frame 102 has been removed)

FIG. 4 is a detail view of the area around the speaker unit 30 of the digital camera 100 pertaining to this embodiment. In FIG. 4, the rear frame 102 has been removed. A rear case unit 207 is disposed in front of the rear frame 102. That is, the rear face of the housing 40 of the digital camera 100 is formed by the rear case unit 207. A second speaker hole 207a (discussed below) is formed in the rear case unit 207.

Here, a watertight internal space is formed on the inside of the housing 40 of the digital camera 100. More precisely, a watertight internal space is formed directly in front of the rear case unit 207. Thus, the rear case unit 207 is one of the units constituting the waterproof structure of the digital camera 100. The housing 40 houses the speaker 209. More precisely, the speaker 209 is housed in the watertight internal space formed inside the housing 40.

A vibrating sheet 205 and an anti-rattle sheet 203 are disposed at the portion of the rear case unit 207 corresponding to the speaker unit 30. In the following description, the product obtained by bonding the anti-rattle sheet 203 to the vibrating sheet 205 shall be referred to as a speaker sheet 206 (one example of a cover). The speaker sheet 206 is fixed to the housing 40 and seals the second speaker hole 207a. The speaker sheet 206 is a member that can be vibrated and has a function of waterproofing. The sound emitted by the speaker 209 is transmitted mainly via air to the speaker sheet 206. When the speaker sheet 206 vibrates, it transmits the sound emitted by the speaker 209 rearward. Meanwhile, the speaker sheet 206 also prevents water from getting into the interior of the housing 40.

The speaker unit 30 includes the vibrating sheet 205, the anti-rattle sheet 203, and at least one second speaker hole 207a. The at least one second speaker hole 207a is formed in the rear case unit 207.

Figure 5:
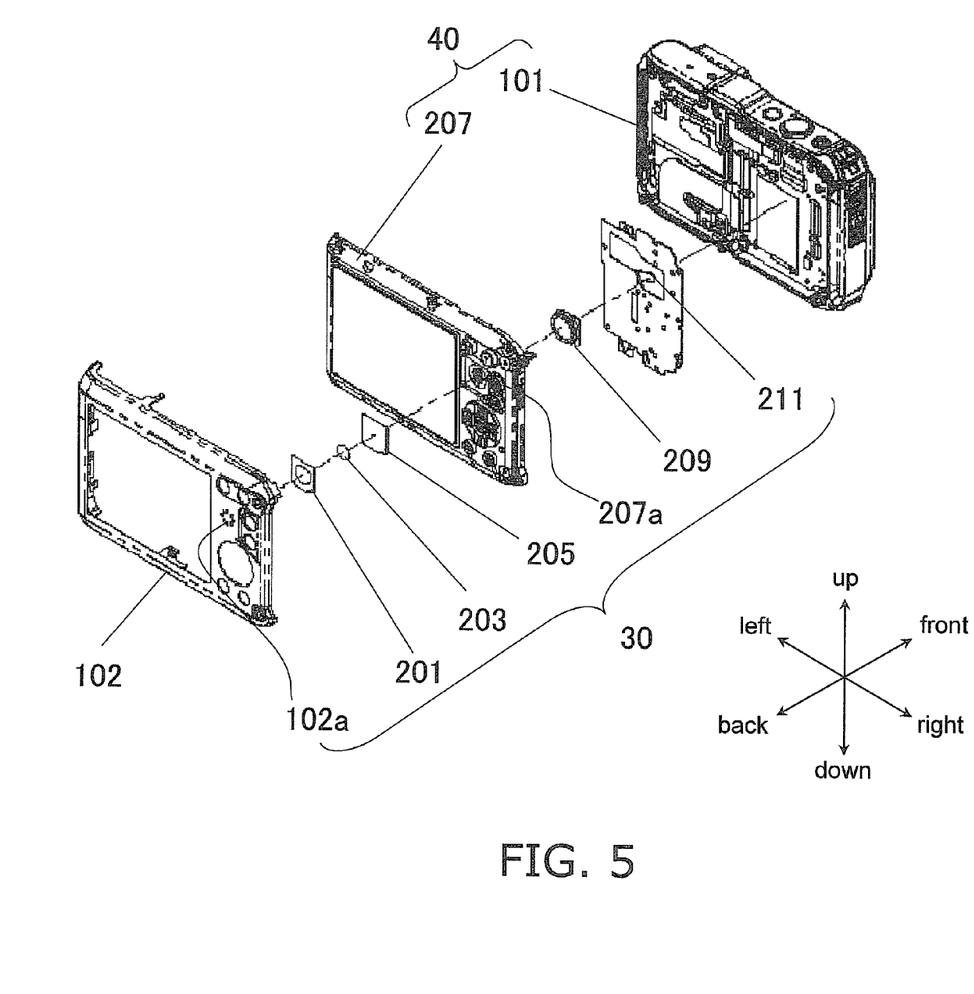
FIG. 5 is an exploded oblique view of the digital camera 100 pertaining to an embodiment.

FIG. 5 is an exploded oblique view of the digital camera 100 pertaining to this embodiment. A dust blocking sheet 201, the anti-rattle sheet 203, the vibrating sheet 205, and the second speaker hole 207a of the rear case unit 207 are provided in that order, starting from the rear, on the inside of the first speaker hole 102a of the rear frame 102. The dust blocking sheet 201 consists of a mesh made from a fibrous material, and prevents foreign matter from finding its way in from the outside.

The speaker 209 and a speaker retainer plate 211 are disposed in front of the rear case unit 207 (on the inside of the rear case unit 207).

The speaker 209 is a sound reproduction device, and has a diaphragm 209a. The speaker 209 converts an electrical signal expressing audio into an audible sound. More specifically, the speaker 209 converts electrical signals into vibrations of the diaphragm 209a. Thus, the speaker 209 is a unit having the function of reproducing sound, and can reproduce audible sounds without relying on the speaker sheet 206.

The speaker retainer plate 211 supports the speaker 209 by pressing it from the front with respect to the rear case unit 207.

The above-mentioned speaker unit 30 refers to a constitution including the first speaker hole 102a of the rear frame 102, the dust blocking sheet 201, the anti-rattle sheet 203, the vibrating sheet 205, the second speaker hole 207a of the rear case unit 207, and the speaker 209.

Configuration of Speaker Sheet 206

Figure 6:
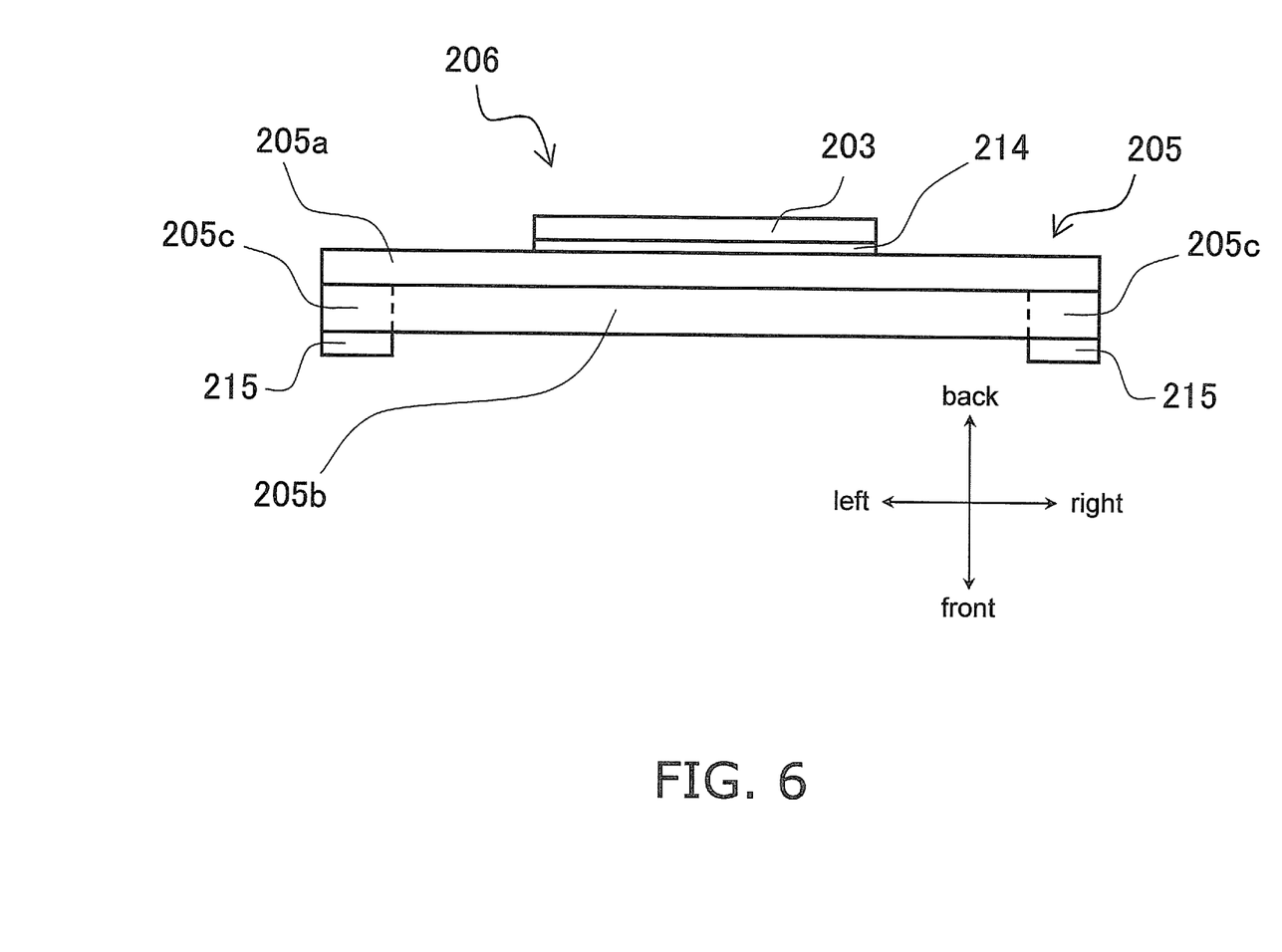
FIG. 6 is a simplified cross section of a speaker sheet 206 pertaining to an embodiment.

FIG. 6 is a simplified cross section of the anti-rattle sheet 203 and the vibrating sheet 205 pertaining to this embodiment.

The anti-rattle sheet 203 is made of a polyester. In this embodiment, the anti-rattle sheet 203 is formed from PET (polyethylene terephthalate). The anti-rattle sheet 203 is a substantially circular film, and is fixed to the vibrating sheet 205. More specifically, the anti-rattle sheet 203 is mounted to the vibrating sheet 205 with an adhesive agent 214. When viewed in the longitudinal direction, the anti-rattle sheet 203 is smaller than the vibrating sheet 205. The anti-rattle sheet 203 is disposed in the approximate center of the vibrating sheet 205.

The vibrating sheet 205 is a substantially rectangular flat member. The vibrating sheet 205 is composed of a PET layer 205a and a silicone rubber layer 205b. In this embodiment, the vibrating sheet 205 is formed as a film using a molten material.

The silicone rubber layer 205b is fixed to the rear case unit 207. The silicone rubber layer 205b has an outer edge part 205c (an example of an outer edge part). The outer edge part 205c is fixed to the rear case unit 207. In this embodiment, the outer edge part 205c and the other portion of the silicone rubber layer 205b are not separate members, and the silicone rubber layer 205b is formed integrally. In FIG. 6, for the sake of description, the boundaries between the outer edge part 205c and the other portion of the silicone rubber layer 205b are indicated by broken lines.

The PET layer 205a is constituted on the outside of the silicone rubber layer 205b, that is, on the side that comes into direct contact with water infiltrating through the first speaker hole 102a of the rear frame 102. In other words, the PET layer 205a is laminated to the outside of the silicone rubber layer 205b (the front face). In this embodiment, the PET layer 205a is laminated over the entire silicone rubber layer 205b. Therefore, the PET layer 205a is also laminated to the outer edge part 205c of the silicone rubber layer 205b. The anti-rattle sheet 203 is constituted on the outside of the vibrating sheet 205 (that is, on the opposite side from the side of the PET layer 205a on which the silicone rubber layer 205b is laminated.

Therefore, in a state in which the vibrating sheet 205 is attached to the digital camera 100, the anti-rattle sheet 203, the PET layer 205a, and the silicone rubber layer 205b are disposed in that order, starting from the rear.

Structure Around Speaker Unit 30

Figure 7:
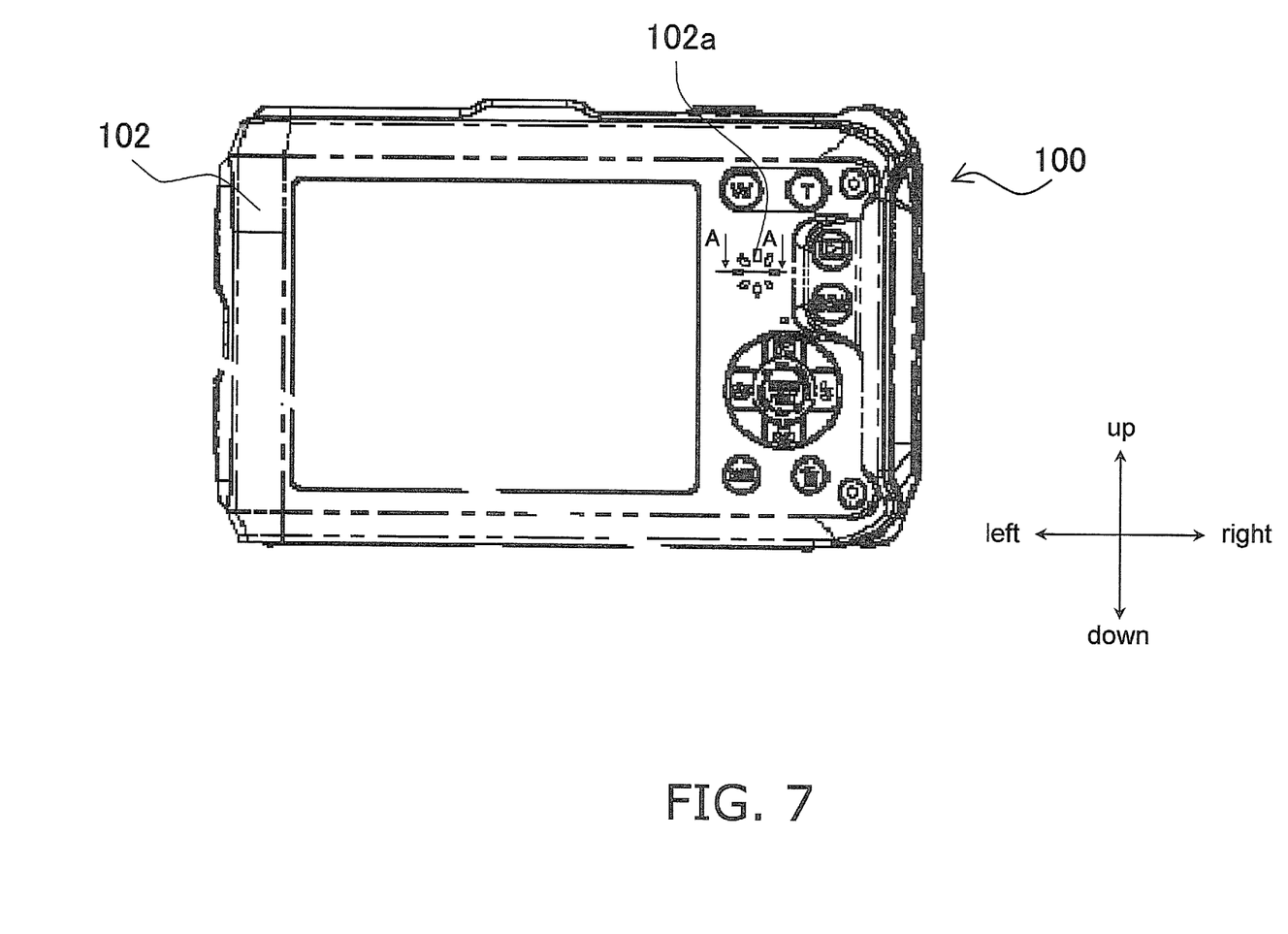
FIG. 7 is a rear view of the digital camera 100 pertaining to an embodiment.
Figure 8:
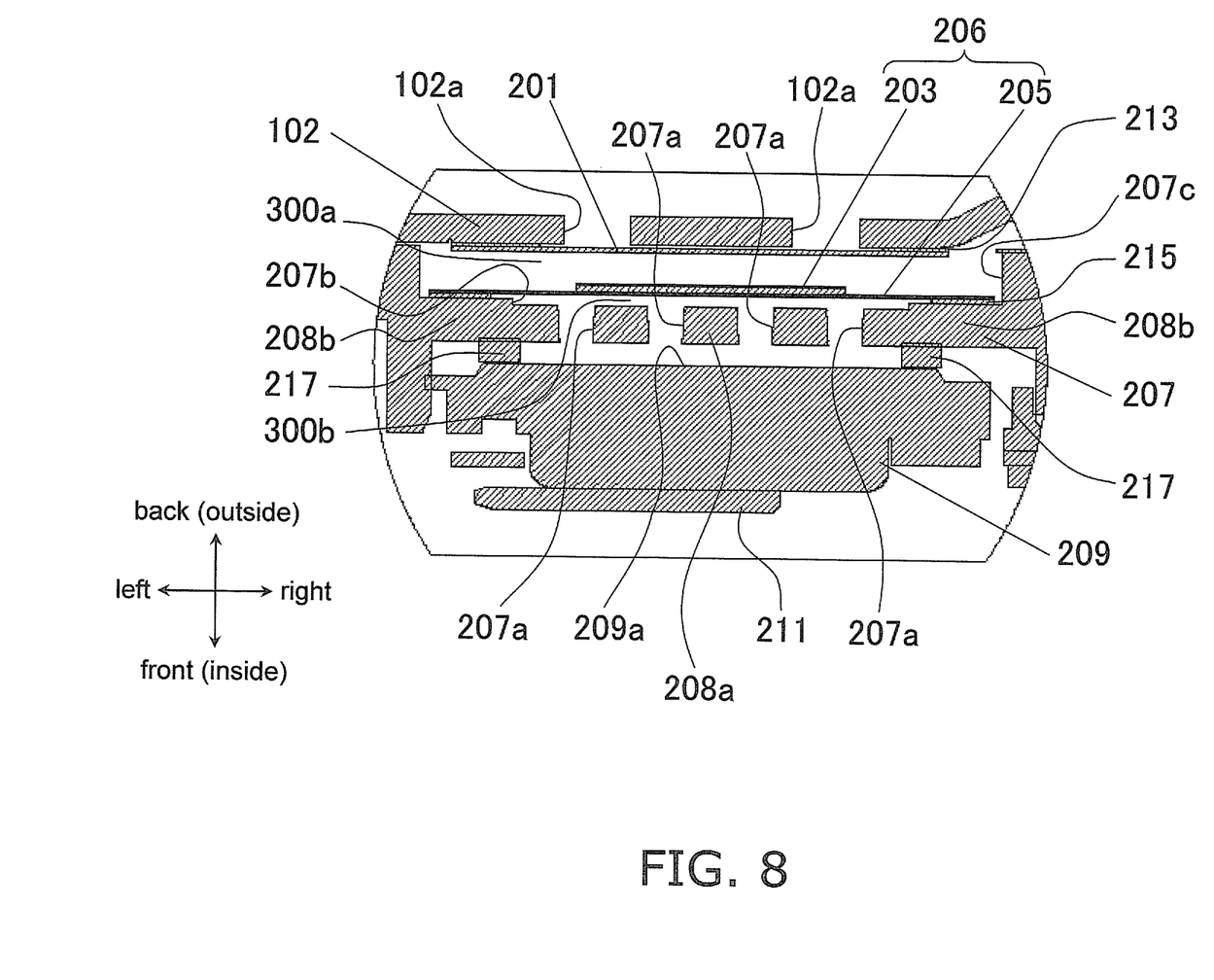
FIG. 8 is a cross section along the AA line when the area around the speaker unit 30 of the digital camera 100 pertaining to an embodiment is in its natural state.

FIG. 7 is a rear view of the digital camera 100 pertaining to this embodiment. FIG. 8 is a cross section along the AA line in FIG. 7 when the area around the speaker unit 30 of the digital camera 100 pertaining to this embodiment is in its natural state. In the description of FIG. 8, for the sake of convenience, "outside" may be referred to as "to the rear," and "inside" may be referred to as "in front of." The term "natural state" refers to a state in which the digital camera 100 is not in water, that is, a state in which the outside of the vibrating sheet 205 is not touching water (is touching air).

The rear frame 102 and the dust blocking sheet 201 are bonded with an adhesive agent 213. The dust blocking sheet 201 (one example of a third portion) is disposed with a space between it and the vibrating sheet 205 on the opposite side of the vibrating sheet 205 from the rear case unit 207. Here, the outside of the rear case unit 207 is recessed inward at a position corresponding to the speaker unit 30. As a result, a first recess 207c is formed in the rear case unit 207. The first recess 207c and the dust blocking sheet 201 form a gap 300a.

The dust blocking sheet 201 covers the first speaker hole 102a so that sand, dust, and the like will not work their way into the gap 300a between the rear frame 102 and the rear case unit 207 from the outside. Since the gap 300a is not kept watertight, water can get into the gap 300a.

The anti-rattle sheet 203 and the vibrating sheet 205 are bonded with the adhesive agent 214. The vibrating sheet 205 and the rear case unit 207 are bonded with an adhesive agent 215. A second recess 207b is provided to the outside of the rear case unit 207, and the second speaker hole 207a is provided in the second recess 207b. The second recess 207b is formed at the bottom of the first recess 207c. The second speaker hole 207a goes through the rear case unit 207 of the housing 40, and transmits sound emitted from the speaker 209. Also, a gap 300b is formed by the space enclosed by the second recess 207b of the rear case unit 207 and the vibrating sheet 205.

The rear case unit 207 has a first portion 208a and a second portion 208b. The first portion 208a is disposed with the gap 300b between it and the vibrating sheet 205. The second speaker hole 207a is formed in the first portion 208a. The second portion 208b is disposed around the first portion 208a. The vibrating sheet 205 is fixed to the second portion 208b. More specifically, the outer edge part 205c of the silicone rubber layer 205b is bonded with an adhesive agent 215 to the second portion 208b. Consequently, the speaker sheet 206 keeps the second recess 207b and the second speaker hole 207a watertight. Thus, the speaker sheet 206 is fixed to the outer surface of the rear case unit 207 and covers the second speaker hole 207a. Here, the first portion 208a forms the bottom of the second recess 207b, and the second portion 208b forms the side walls of the second recess 207b.

A speaker cushion 217 is provided between the speaker 209 and the rear case unit 207. The speaker 209 is pressed by the speaker retainer plate 211 against the rear case unit 207 via the speaker cushion 217. As a result, the diaphragm 209a of the speaker 209 faces outward and is faced to the second speaker hole 207a. Also, the speaker cushion 217 is disposed along the outer edge part of the speaker 209 and suppresses the transmission of sound in a direction along the diaphragm 209a. Accordingly, sound emitted from the speaker 209 is unlikely to leak inside the housing 40, so sound is transmitted efficiently to the outside of the housing 40.

With the constitution of the speaker unit 30 of the digital camera 100 pertaining to this embodiment, the first speaker hole 102a of the rear frame 102, the adhesive agent 213 between the rear frame 102 and the dust blocking sheet 201, the dust blocking sheet 201, the anti-rattle sheet 203, the adhesive agent 214 between the anti-rattle sheet 203 and the vibrating sheet 205, the vibrating sheet 205, the adhesive agent 215 between the vibrating sheet 205 and the rear case unit 207, the second speaker hole 207a of the rear case unit 207, the speaker cushion 217, the speaker 209, and the speaker retainer plate 211 are disposed in that order, starting from the outside.

Correspondence of Names

The second speaker hole 207a is one example of a through-hole. The housing 40 is one example of a housing. The speaker sheet 206 is one example of a cover. The silicone rubber layer 205b is one example of a first sheet. The PET layer 205a is one example of a second sheet. The anti-rattle sheet 203 is one example of a weight member.

Behavior of Speaker Sheet 206 in Natural and Pressurized States

The behavior of the speaker unit 30 in its natural state will be described through reference to FIG. 8.

The sound emitted from the speaker 209 goes through the second speaker hole 207a of the rear case unit 207 and vibrates the speaker sheet 206. The sound emitted from the speaker 209 at this point is transmitted through the speaker sheet 206 to the outside. Here, the attenuation of the sound can be suppressed by making the speaker sheet 206 sufficiently thin. In this embodiment, the thickness of the PET layer 205a is 40 μm, and the thickness of the silicone rubber layer 205b is 50 μm. Also, the mesh size of the dust blocking sheet 201 is set to be large enough for sound to pass through, so there is almost no sound attenuation by the dust blocking sheet 201.

The speaker sheet 206 is vibrated in the longitudinal direction by sound emitted from the speaker 209, but because the gap 300a is provided, which is sufficiently larger than the amplitude of the vibration, the speaker sheet 206 and the dust blocking sheet 201 do not come into contact and cause rattle. Similarly, because the gap 300b, which is sufficiently larger than the amplitude of the vibration of the speaker sheet 206, is provided between the speaker sheet 206 and the rear case unit 207, the speaker sheet 206 and the rear case unit 207 do not come into contact with each other to produce a rattling sound.

Thus, the size of the gap 300a and the gap 300b is decided by taking into account the amplitude of the speaker sheet 206.

As a result, there is almost no rattle in a normal state in the air. The phrase "in a normal state in the air" refers to a state in which there is no abnormal deformation of the speaker sheet 206. Abnormal deformation of the speaker sheet 206 can occur when there is a sudden atmospheric pressure differential inside and outside the rear case unit 207.

In this embodiment, the gap 300a and the gap 300b are an intentional part of the design. However, the gap 300a and the gap 300b can also include gaps produced by error in the design and manufacturing process.

Also, since the vibrating sheet 205 is impervious to air, when the vibrating sheet 205 vibrates, the air inside the housing 40 is compressed or expands. That is, the air inside the housing 40 acts as a kind of spring with respect to the vibrating sheet 205. In this case, the vibrating sheet 205 is relatively susceptible to the effects of self-resonance. The term self-resonance as used here means standing waves that can occur in the vibrating sheet 205 for example. If vibration of the vibrating sheet 205 exceeds a certain amount, the vibrating sheet 205 itself may undergo self-resonance and create rattle. The rattle referred to here is not an abnormal sound produced when the vibrating sheet 205 comes into contact with other members, but rather an abnormal sound produced by the vibrating sheet 205 itself.

The anti-rattle sheet 203 is provided in order to reduce this self-resonance. The anti-rattle sheet 203 is fixed to the vibrating sheet 205, and thereby adjusts the characteristics of the speaker sheet 206 related to vibration so that self-resonance is suppressed in the speaker sheet 206. An example of adjusting the characteristics related to vibration here is when the vibration frequencies at which standing waves occur (that is, the frequencies of standing waves) are moved to a higher vibration frequency region. The occurrence of standing waves can be suppressed by thus shifting the frequencies of standing waves from the main vibration frequency region within the audible range.

In this embodiment, the characteristics related to vibration of the speaker sheet 206 are adjusted by adjusting the thickness and weight distribution. More specifically, the thickness of the speaker sheet 206 is adjusted with the anti-rattle sheet 203. That is, the thickness of the speaker sheet 206 is increased at the location where the anti-rattle sheet 203 is affixed. The weight distribution of the speaker sheet 206 is also adjusted with the anti-rattle sheet 203. That is, the anti-rattle sheet 203 also functions as a weight on the vibrating sheet 205.

Figure 9:
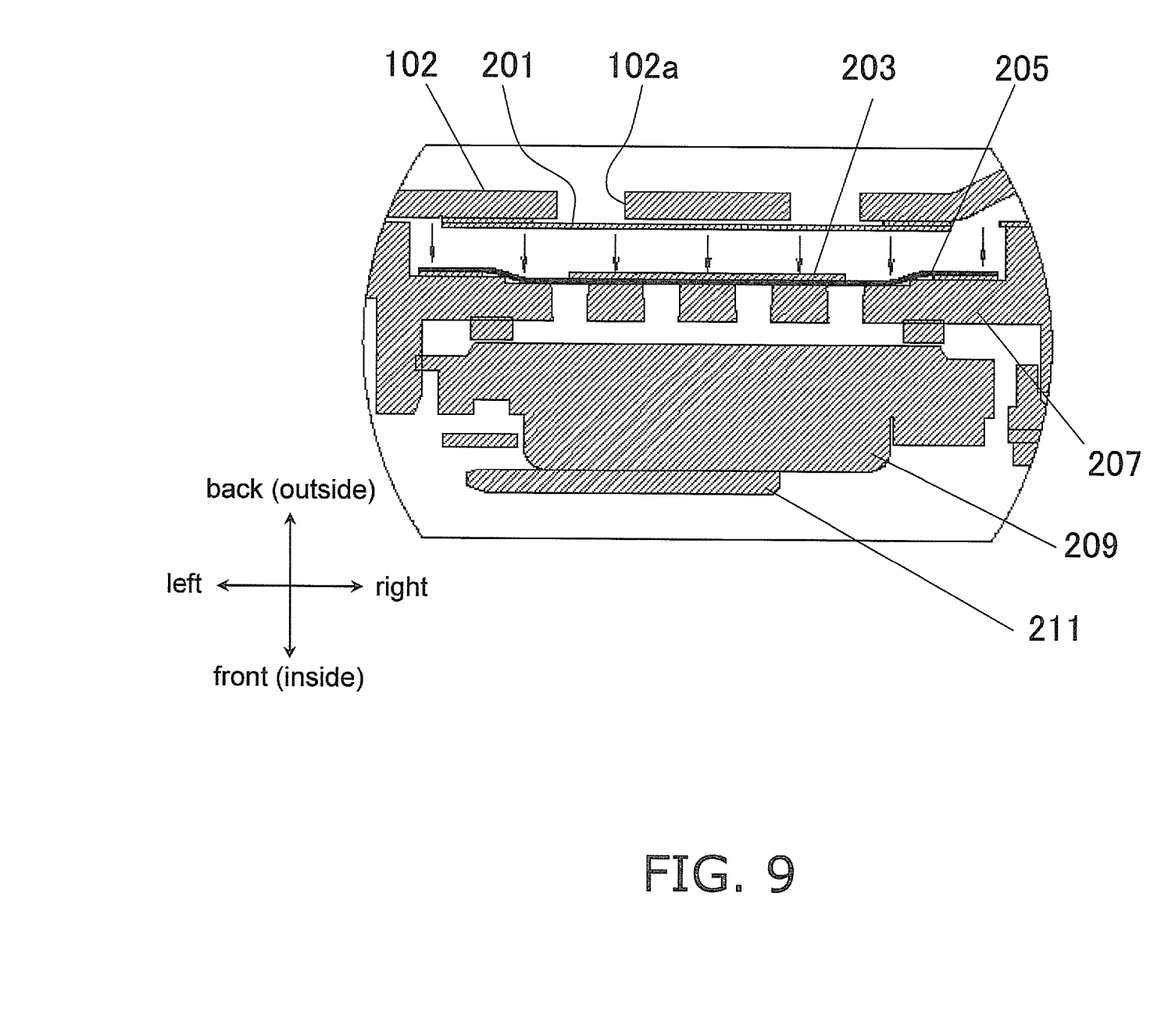
FIG. 9 is a cross section along the AA line when the area around the speaker unit 30 of the digital camera 100 pertaining to an embodiment is in a pressurized state.

FIG. 9 is a cross section along the AA line when the area around the speaker unit 30 of the digital camera 100 pertaining to this embodiment is in a pressurized state. In the description of FIG. 9, once again the term "outside" may mean "to the rear," and "inside" may mean "in front of." The term "pressurized state" refers to a state in which the digital camera 100 is in water, and at least a certain amount of water pressure is exerted on the vibrating sheet 205 from the outside. In FIG. 9, the direction in which water pressure is exerted is indicated by the arrows.

When the digital camera 100 enters a pressurized state, the speaker sheet 206 is pushed by water pressure toward the rear case unit 207, which reduces or eliminates the gap 300b. On the other hand, when the digital camera 100 is removed from water, the speaker sheet 206 is released from its pressurized state. At this point, depending on the material of the speaker sheet 206, the gap 300b may not be large enough even after the pressurized state has been released. For example, it is conceivable that the vibrating sheet 205 is formed solely from a material that undergoes plastic deformation relatively easily. In that case, if the speaker sheet 206 should be plastically deformed by water pressure and be fixed in a state of a reduced gap 300b, there is the possibility that rattle will occur. More specifically, when the speaker 209 emits sound, the speaker sheet 206 vibrates, comes into contact with the rear case unit 207, and creates rattle. Also, repeated plastic deformation can fatigue and damage the vibrating sheet 205.

With this embodiment, however, since the PET layer 205a of the vibrating sheet 205 is given adequate stiffness, plastic deformation of the vibrating sheet 205 can be suppressed.

Also, since the elasticity of the silicone rubber layer 205b is greater than the elasticity of the PET layer 205a, the sound pressure performance of the vibrating sheet 205 can be maintained. More specifically, the vibrating sheet 205 is given suitably flexibility by providing the silicone rubber layer 205b to the vibrating sheet 205. Because the vibrating sheet 205 is suitably pliant, it is possible for the vibrating sheet 205 to be vibrated fully, which ensures good sound pressure.

If water pressure causes the vibrating sheet 205 to bend, the silicone rubber layer 205b disposed between the rear case unit 207 and the PET layer 205a deforms flexibly. As a result, it is less likely that an excessive external force will be exerted on the PET layer 205a. Consequently, deformation of the vibrating sheet 205 in a pressurized state occurs mainly within the range of elastic deformation, and plastic deformation of the vibrating sheet 205 can be suppressed. As a result, there is less fatigue of the vibrating sheet 205 due to plastic deformation. Also, because the silicone rubber layer 205b of the vibrating sheet 205 has adequate elastic strength, it is easier for the gap 300b to be restored to its size in a natural state upon release from a pressurized state, so the vibrating sheet 205 is less apt to undergo plastic deformation.

Using the vibrating sheet 205 pertaining to this embodiment as discussed above diminishes the adverse effects that can happen in speaker sound quality, which are caused by being put in a pressurized state.

The term "stiffness" here means resistance to deformation. More specifically, the amount of deformation of the PET layer 205a with respect to a specific tensile force is smaller than the amount of deformation of the silicone rubber layer 205b with respect to the same tensile force. Also, the amount of bending of the PET layer 205a with respect to a specific water pressure is smaller than the amount of bending of the silicone rubber layer 205b with respect to the same water pressure. The degree of stiffness may be determined on the basis of the modulus of elasticity of the material. An example of the modulus is the Young's modulus.

Also, since the vibrating sheet 205 is fixed on the outside of the housing 40, in a pressurized state the vibrating sheet 205 and the adhesive agent 215 on the rear case unit 207 are pressed toward the inside of the housing 40, and are weighted in this direction. Specifically, the vibrating sheet 205 is pushed by water pressure toward the rear case unit 207, and is weighted so as to promote bonding of the vibrating sheet 205 and the rear case unit 207. Accordingly, the vibrating sheet 205 and the rear case unit 207 are less likely to peel apart. Thus fixing the vibrating sheet 205 to the outside of the housing 40 reduces the likelihood that water or another liquid will infiltrate the inside of the housing 40, and ensures a good waterproofing function. The water pressure resistance of the digital camera 100 can also be enhanced.

The vibrating sheet 205 is provided on the outside of the rear case unit 207 as discussed above, but the vibrating sheet 205 is protected by the rear frame 102. That is, since the rear frame 102 is further provided on the outside of the vibrating sheet, the vibrating sheet 205 is not exposed to the outside.

Since the vibrating sheet 205 is thus protected by the rear frame 102, the vibrating sheet 205 will not be easily peeled off.

Action and Effect

As described above, a waterproof structure for an electronic device, in which good sound pressure can be ensured while at the same time reducing rattle, can be provided by providing the electronic device with the speaker sheet 206 having the PET layer 205a and the silicone rubber layer 205b as discussed above.

The action and effect of the waterproof structure pertaining to this embodiment will now be described.

(1) The waterproof structure of the digital camera 100 has the silicone rubber layer 205b, the PET layer 205a that is laminated to the silicone rubber layer 205b and is stiffer than the silicone rubber layer 205b, and the speaker sheet 206 that is fixed to the outer surface of the rear case unit 207 and seals the second speaker hole 207a.

With this waterproof structure, since the PET layer 205a is stiffer than the silicone rubber layer 205b, there is less deformation of the speaker sheet 206 in a pressurized state than when the PET layer 205a is formed from silicone rubber. As a result, the speaker sheet 206 as a whole undergoes less plastic deformation. Consequently, even if the vibration of the speaker sheet 206 is increased, it will be unlikely for the speaker sheet 206 to come into contact with other members, so there will be less rattling.

Furthermore, since the silicone rubber layer 205b is not as stiff as the PET layer 205a, the speaker sheet 206 as a whole can be deformed more flexibly than when the silicone rubber layer 205b is formed from PET. Consequently, it is possible for the speaker sheet 206 to vibrate fully. As a result, the sound pressure can be higher than when the silicone rubber layer 205b is formed from PET.

The technology disclosed herein provides a waterproof structure for an electronic device with which good sound pressure is ensured while at the same time reducing rattle noise.

(2) Since the silicone rubber layer 205b is fixed to the rear case unit 207, the silicone rubber layer 205b is disposed between the PET layer 205a and the rear case unit 207. Consequently, the PET layer 205a is unlikely to come into contact with the rear case unit 207, and is protected by the silicone rubber layer 205b. As a result, even if water pressure is exerted on the speaker sheet 206, it will be unlikely for excessive force to be exerted on the PET layer 205a, and plastic deformation of the PET layer 205a can be suppressed.

(3) Since the speaker sheet 206 is fixed on the outer surface of the housing 40, in a pressurized state the speaker sheet 206 is pushed toward the rear case unit 207 by water pressure. Since the speaker sheet 206 is thus pressed against the housing 40 by water pressure, the speaker sheet 206 is less likely to peel away from the rear case unit 207 than when the speaker sheet 206 is fixed on the inner surface of the housing 40. As a result, the water pressure resistance of the digital camera 100 can be enhanced.

(4) The rear case unit 207 has the first portion 208a disposed with the gap 300b between it and the speaker sheet 206, and the second portion 208b that is disposed around the first portion 208a and to which the speaker sheet 206 is fixed. Since the gap 300b is thus ensured, the speaker sheet 206 can vibrate without coming into contact with the rear case unit 207. As a result, rattle can be further suppressed.

(5) Also, the dust blocking sheet 201 is disposed on the opposite side of the speaker sheet 206 from the rear case unit 207, with the gap 300a between it and the speaker sheet 206.

Since the gap 300a is thus ensured, the speaker sheet 206 can vibrate without coming into contact with the dust blocking sheet 201.

(6) Since the anti-rattle sheet 203 is fixed to the PET layer 205a, the self-resonance of the speaker sheet 206 is suppressed, and noise attributable to self-resonance can be reduced.

(7) The silicone rubber layer 205b has the outer edge part 205c fixed to the housing 40, and part of the PET layer 205a is laminated to the outer edge part 205c. Consequently, the PET layer 205a is securely fixed to the housing 40 via the silicone rubber layer 205b. As a result, excessive deformation of the speaker sheet 206 is suppressed, and it is less likely that the speaker sheet 206 will undergo plastic deformation.

Other Embodiments

The technology disclosed herein does not need to be limited to the above embodiment, and various modifications are possible without departing from the gist of the invention.

(A) In the above embodiment, PET, which is weather resistant and has high strength, was used as the material for the PET layer 205a of the vibrating sheet 205, but a material other than PET may be used instead. For example, a PBT (polybutylene terephthalate) layer may be formed in place of the PET layer 205a on the vibrating sheet 205. Also, in the above embodiment, silicone rubber, which is elastic and weather resistant, was used as the material of the silicone rubber layer 205b, but a material other than silicone rubber may be used instead. For example, an EPDM (ethylene-propylene-diene rubber) layer may be formed in place of the silicone rubber layer 205b on the vibrating sheet 205.

(B) In the above embodiment, the vibrating sheet 205 was bonded to the outer surface of the rear case unit 207, but the location where the vibrating sheet 205 is fixed need not be on the outer surface of the rear case unit 207. For example, if the water pressure anticipated to be exerted on the vibrating sheet 205 is less than a certain amount, a constitution may be employed in which the vibrating sheet 205 is bonded to the inner surface of the rear case unit 207.

When this is done, since the vibrating sheet 205 is bonded to the inner surface of the rear case unit 207, the water pressure resistance of the digital camera 100 be relatively low compared to the constitution in the above embodiment. Nevertheless, since the vibrating sheet 205 also serves a function as the dust blocking sheet 201, there is no need for the dust blocking sheet 201, and furthermore the vibrating sheet 205 will not be exposed to the exterior even if there is no rear frame 102, so there is no need for the rear frame 102.

Accordingly, the digital camera 100 can have a simple constitution, which brings down the cost. In this case, it is preferable to ensure the same gap as the gap 300b in the above embodiment on the inside and outside of the vibrating sheet 205. More specifically, it is preferable for there to be a recess on the inside of the rear case unit 207 so as to form a gap between the rear case unit 207 and the vibrating sheet 205.

(C) In the above embodiment, the anti-rattle sheet 203 was formed from PET, but a material other than PET may be used instead. For example, the anti-rattle sheet 203 may be formed from a polyester other than PET, or from another resin.

Also, the anti-rattle sheet 203 need not be a film. For instance, the anti-rattle sheet 203 may be a woven fabric or non-woven paper. However, if the anti-rattle sheet 203 absorbs water, this affects sound quality. Therefore, the anti-rattle sheet is preferably in a form that does not readily absorb water. The shape of the anti-rattle sheet 203 may be something other than circular.

(D) In the above embodiment, the PET layer 205a was laminated over the entire silicone rubber layer 205b, but the PET layer 205a may be laminated over just part of the silicone rubber layer 205b. Also, the silicone rubber layer 205b may be laminated over part of the PET layer 205a.

From the standpoint of suppressing plastic deformation, however, at least part of the PET layer 205a is preferably laminated over the outer edge part 205c of the silicone rubber layer 205b. This allows the PET layer 205a to be securely supported by the rear case unit 207, so excessive deformation of the speaker sheet 206 can be suppressed.

(E) In the above embodiment, the silicone rubber layer 205b was thicker than the PET layer 205a, but the thickness of these layers may be different from what is given in the above embodiment. For example, the PET layer 205a may be thicker than the silicone rubber layer 205b.

(F) In the above embodiment, the silicone rubber layer 205b was fixed to the rear case unit 207, but the PET layer 205a may be fixed to the rear case unit 207. For example, in the above embodiment, it is possible to switch around the PET layer 205a and the silicone rubber layer 205b. In this case, the silicone rubber layer 205b is disposed on the outside of the PET layer 205a (that is, on the opposite side from the rear case unit 207). Disposing the vibrating sheet 205 in this way again allows the overall plastic deformation of the vibrating sheet 205 to be suppressed.

(G) In the above embodiment, the vibrating sheet 205 was formed from a material that was impervious to air, but the vibrating sheet 205 may be formed from a material that transmits air, so long as the second speaker hole 207a can be kept watertight.

(H) In the above embodiment, the vibrating sheet 205 was substantially rectangular, but the shape of the vibrating sheet 205 may be something other than rectangular. For example, the vibrating sheet 205 may be in the form of a polygon other than a rectangle, or may have a shape with an edge formed by a curve. Also, the vibrating sheet 205 is not limited to being completely flat. For example, to the extent that good sound pressure can be ensured, bumps may be provided to the vibrating sheet 205.

(I) In the above embodiment, the speaker sheet 206 was disposed on the rear face of the digital camera 100, but the speaker sheet 206 may be disposed somewhere other than the rear face. For example, the speaker sheet 206 may be disposed on the upper face, the side face, or the front face of the digital camera 100.

(J) In the above embodiment, the digital camera 100 was described as one example of an "electronic device," but the "electronic device" is not limited to a digital camera. Examples of "electronic devices" include video cameras, portable telephones, and IC recorders. Naturally, devices that record audio by an analog method are also encompassed by "electronic device."

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Accordingly, these terms, as utilized to describe the present invention should be interpreted relative to a waterproof structure for an electronic device.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

The term "stiffness" as used herein means resistance to deformation. For instance, if the amount of deformation of the second sheet in relation to a specific tensile force is less than the amount of deformation of the first sheet in relation to the same tensile force, then the stiffness of the second sheet can be said to be greater than the stiffness of the first sheet.

The term "seal" as used herein means that at least a watertight seal is ensured. Therefore, "is sealed" encompasses a case in which a watertight seal is ensured, but, for example, not an airtight seal.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A waterproof structure for an electronic device, comprising:
    a speaker;
    a housing defining an interior space to hold the speaker, the housing including at least one through-hole to transmit sound produced by the speaker; and
    a cover including a first sheet and a second sheet laminated to the first sheet, the stiffness of the second sheet being greater than the stiffness of the first sheet, the cover being fixed to a surface of the housing to seal the at least one through-hole.

2. The waterproof structure according to claim 1, wherein the first sheet is fixed to the surface of the housing.

3. The waterproof structure according to claim 1, wherein the cover is fixed to an outer surface of the housing.

4. The waterproof structure according to claim 1, wherein the housing further includes a first portion having the at least one through-hole and a second portion, the first portion being disposed space apart from and extending over the cover, the second portion being disposed around the periphery of the first portion to fixedly support the cover.

5. The waterproof structure according to claim 4, further comprising
a third portion disposed space apart from and extending over the cover, the third portion being positioned on the opposite side of the cover from the first portion.

6. The waterproof structure according to claim 1, wherein the cover further includes a weight member fixed to the second sheet.

7. The waterproof structure according to claim 2, wherein an outer edge part of the first sheet is fixed to the surface of the housing, and
a portion of the second sheet is laminated to the outer edge part of the first sheet.

8. The waterproof structure according to claim 1, wherein the first sheet is formed of silicone rubber, and
the second sheet is formed of polyethylene terephthalate.

* * * * *